United States Patent [19]

Hine, Jr. et al.

[11] 4,260,086
[45] Apr. 7, 1981

[54] SUPPORT DEVICE FOR BICYCLE HANDLEBAR PACK

[75] Inventors: Edward K. Hine, Jr., Louisville; Gregory S. Hine, Boulder, both of Colo.

[73] Assignee: Hine-Snowbridge, Inc., Boulder, Colo.

[21] Appl. No.: 121,189

[22] Filed: Feb. 13, 1980

[51] Int. Cl.³ .............................................. B62J 7/06
[52] U.S. Cl. ................................... 224/36; 224/30 A; 224/41
[58] Field of Search ................ 224/30 R, 30 A, 32 R, 224/ 32 A, 33 R, 33 A, 40, 41, 35, 36, 37, 38, 39, 276

[56] References Cited

U.S. PATENT DOCUMENTS

| 583,731 | 6/1897 | Burch | 224/33 A |
|---|---|---|---|
| 2,492,595 | 12/1949 | Rhoer | 224/41 |
| 3,937,374 | 2/1976 | Hine, Jr. | 224/32 A |
| 3,955,728 | 5/1976 | Jackson et al. | 224/36 X |
| 4,056,219 | 11/1977 | Hine, Jr. | 224/36 |
| 4,066,196 | 1/1978 | Jackson et al. | 224/41 X |

Primary Examiner—Pollard Steven M.
Attorney, Agent, or Firm—O'Rourke & Harris

[57] ABSTRACT

An improved structure for attaching a handlebar pack to a wire support in which the wire support includes at least a member positioned adjacent the rear portion of the handlebar pack, the support attachment including spring clip members attached to the rear portion of the handlebar pack which distend to receive and positively locate the wire support at positions spaced more than one hundred eighty degrees around the support, the wire support preferably being a cantilevered support adapted to engage the gooseneck-handlebar intersection of a bicycle, and extending forward therefrom with substantially horizontal forked members adapted to engage pocket portions defined on either side of the pack, with the pocket portions preferably being closed at the sections thereof receiving the termini of the forked members.

10 Claims, 6 Drawing Figures

4,260,086

SUPPORT DEVICE FOR BICYCLE HANDLEBAR PACK

BACKGROUND OF THE INVENTION

1. Field of the Invention

The present invention relates generally to packs adapted to be mounted at the handlebar portion of a bicycle and supports therefor, and more particularly to a bicycle pack and support system in which resilient spring clip members are employed to positively secure the pack to the support while providing for ready detachment of the pack from the support, and, preferably, maintaining the pack in an open or spread configuration.

2. Description of the Related Art

Various handlebar packs and supports have been available in the trade for some time. While early supports utilized strap members which encircled the bicycle handlebars and thus attached the pack, more recently heavy wire supports which engage the intersection of the gooseneck and handlebar and extend forward therefrom have been utilized. Typically, such supports extend first outward, and then diverge into horizontal forked members, or are bent downward and outward to provide a support under the pack.

Typical of the related art pack and support arrangements are those described in U.S. Pat. Nos. 3,955,728, 4,056,219 and 4,066,196. Particularly in the latter two patents, which disclose wire supports of the preferred type, the pack is attached to the support to limit forward movement by means of Velcro fasteners. Such Velcro material has been almost universally utilized as fasteners in such pack and support arrangements. While this has been convenient and workable, it is also true that the Velcro material tends to loosen incrementally upon repeated jolts which stress the material encircling the support. Accordingly, the bag has not been as securely supported as desired. Movement of the bag relative to the support and particularly upon the forked members in the preferred embodiments, has resulted.

The slow loosening of the Velcro attachment means has been found in most embodiments of such supports, including those in which resilient fasteners extend between the bag and/or support, and, for instance, the front axle area of the bicycle, or the adjacent fork neck area of the bicycle. Particularly in view of the "hard" ride afforded by most bicycle with high pressure tires and little compliance in the frame or wheels, the loosening of the handlebar pack as a result of such jolts can be annoying in that the weight of the pack tends to move relative to the bicycle. Even a minor shifting of weight in such manner is somewhat discomforting to the rider.

Also, while the forked support holds the pack open in one direction, the pack has been free to slide along the forked members and thus has not been maintained open in the direction parallel to the forked members.

SUMMARY OF THE INVENTION

The present invention, which provides heretofore unavailable improvements over previous bicycle handlebar packs and supports, comprises a secure and simple means for positively attaching the handlebar pack to a wire handlebar support. At least one, but preferably a pair of resilient spring clip members, preferably of metal or polymeric material, are provided at the back of the bicycle pack and positioned to distend to engage and attach to the wire pack support. Thus even repeated shocks at the attachment interface between the wire support and the pack does not loosen the attachment as in prior embodiments of similar pack support arrangements. In a particularly preferred embodiment, the end portions of the pockets adapted to receive the forked members of the wire support are closed and the clip members utilized to provide a pretension at the end of the forked members and the pockets thereby holding the bag in an open or extended position.

Accordingly, an object of the present invention is to provide a new and improved bicycle handlebar pack and support configuration which utilizes convenient, lightweight and secure resilient spring clip members.

Another object of the present invention is to provide a new and improved bicycle handlebar pack and support arrangement in which loosening of the pack relative to the support is avoided.

Yet another object of the present invention is to provide a new and improved bicycle handlebar pack and support configuration in which the support serves to hold the pack in an open configuration in the lateral and fore and aft directions.

These and other objects and features of the invention will become apparent from the following description.

DETAILED DESCRIPTION OF THE INVENTION

Figure 1:
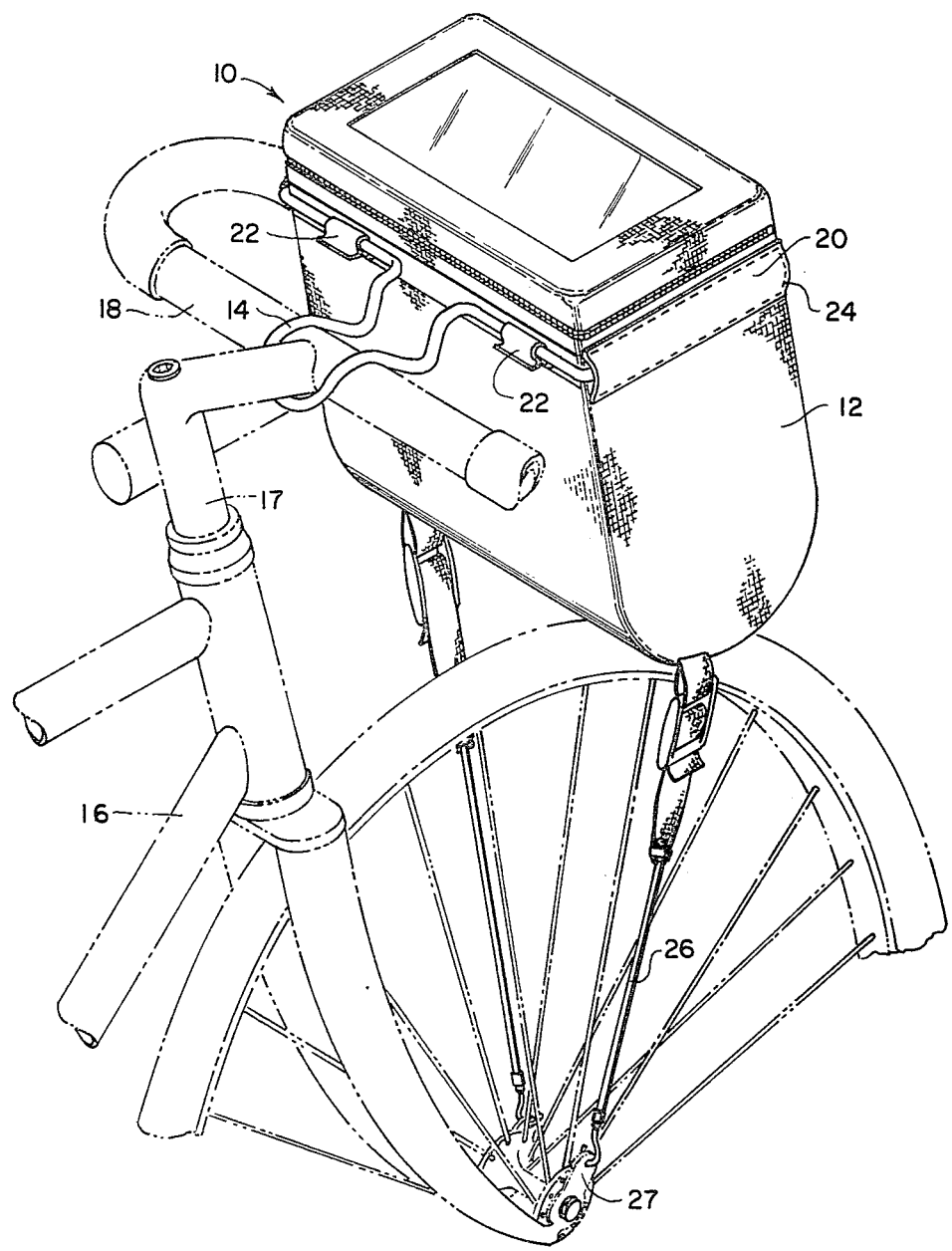
FIG. 1 is a perspective view of a bicycle pack and wire support arrangement illustrated relative to a phantom bicycle.
Figure 2:
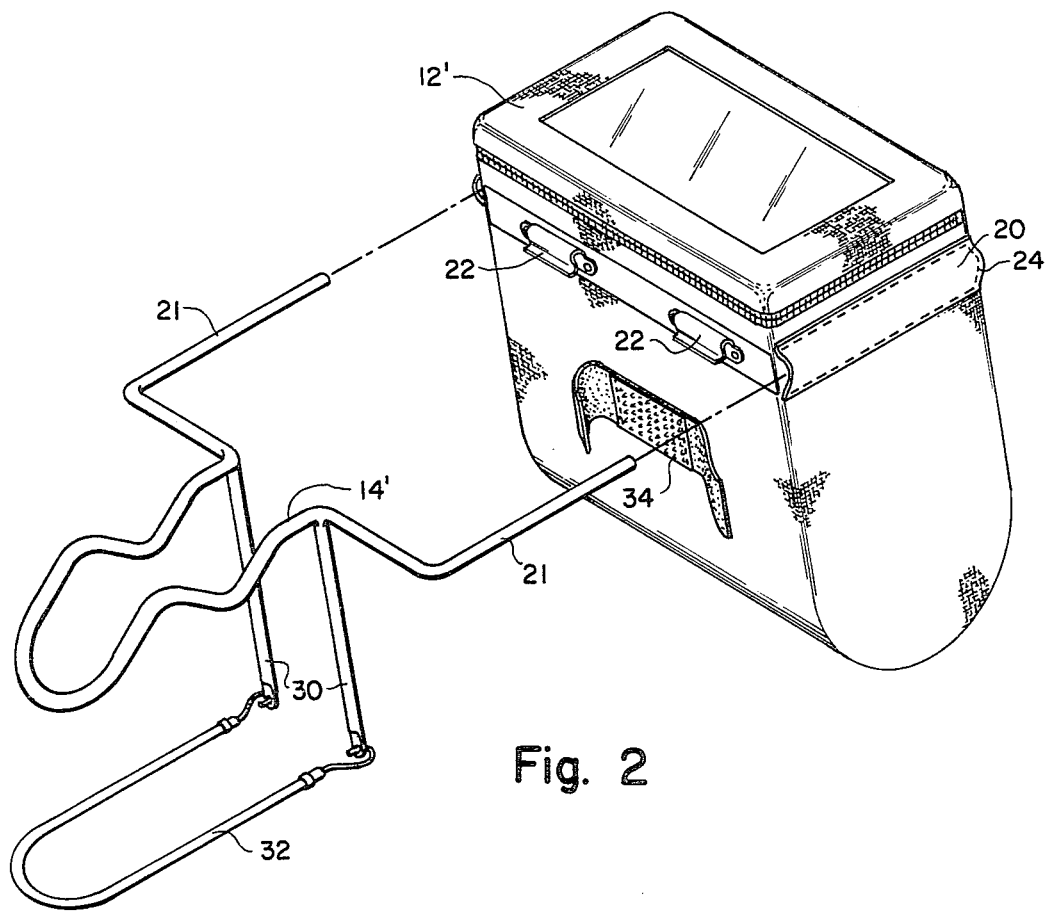
FIG. 2 is an exploded view of another embodiment of a bicycle pack and support arrangement illustrating both the resilient spring clip member of the instant invention and the prior art attachment means.

Turning now to the drawing, wherein like components are designated by like reference numerals throughout the various figures, a handlebar pack including the resilient spring clip members of the instant invention and a wire support are illustrated in FIGS. 1 and 2 and generally designated by the reference numeral 10 in FIG. 1. As shown in FIG. 1, pack 12 is carried on wire support 14. Bicycle 16, which is shown in ghosted fashion, includes gooseneck 17 and handlebars 18 extending therefrom. Wire support 14 is carried at the intersection of gooseneck 17 and handlebars 18 and cantilevered forward thereof. Pockets 20, defined on opposed sides of pack 12, received forked members 21, more readily recognized with reference to similar wire support 14' shown in FIG. 2. Resilient spring clips 22 are attached to the back wall of pack 12 and adapted to securely engage wire support 14 at points spaced at least one hundred eighty degrees therearound to securely fix wire support 14 and pack 12 together and avoid movement of wire support 14 in pockets 20. Pocket ends 24 are preferably closed such that the ends of wire supports 14 presses thereagainst. In this manner, the front portion of pack 12 is positioned in an extended or open position. As is conventional, resilient cords 26 may extend from pack 12 for attachment to bicycle 16 at member 27 adjacent the axel of bicycle 16.

Figure 5:
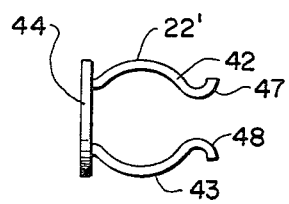
FIGS. 5 and 6 are illustrations of alternative resilient spring clip members according to the instant invention with FIG. 5 being an end view of the clip and FIG. 6 being a front view of the clip.
Figure 6:
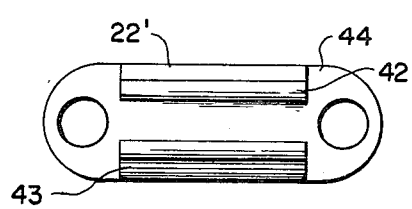

A variation is illustrated in FIG. 2, wherein wire support 14', which is otherwise the same as wire support 14 of FIG. 1, includes vertically depending members 30 and elastomeric member 32 adapted to engage the adjacent neck portion of a bicycle. Thus, wire support 14', which also includes forked members 21, is otherwise substantially functionally identical to wire support 14 and pack 12 illustrated in FIG. 1. Pockets 20 of pack 12' also receive forked members 21 and bear against the pocket end 24. Velcro material 34 on pack 12' is included to engage depending members 30, but it is to be understood that resilient spring clips as illustrated at FIGS. 5 and 6 may advantageously be utilized as described below. However, with resilient spring clip members 22 to provide primary attachment, Velcro material 34 would be workable.

Figure 3:
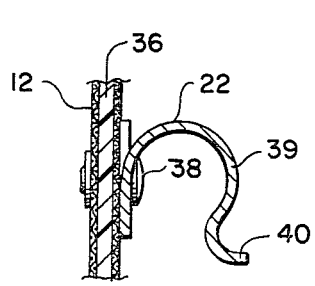
FIGS. 3 and 4 are illustrations of a preferred resilient spring clip member according to the instant invention, with FIG. 3 being a cross sectional view of the clip member shown in FIG. 4.
Figure 4:
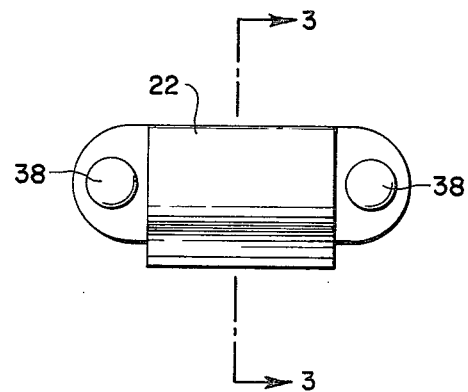

Resilient spring clip member 22 is illustrated in more detail in FIGS. 3 and 4. As shown, resilient clip member 22 is attached to pack 12, which includes an internal stiffener 36 by rivets 38. As shown particularly well in FIG. 3, clip member 22 includes a spring member 39 of partial cylindrical shape, of a distendable spring material such as metal or a polymer, is when configured to partially encircle wire support 14 for somewhat more than one hundred eighty degrees thereof, but includes an open portion to facilitate disengagement of wire support 14 from resilient clip member 22. Resilient clip member 22 preferably includes a ramp portion 40 in the form of a compound curve at the end of spring member 30 and adapted to initially engage wire support 14 to permit convenient attachment of resilient spring clip member 22 to wire support 14. Preferably the opening of resilient spring clip member 22 is disposed perpendicularly to or in the direction of major forces imposed on clip member 22. Thus, in the embodiment of FIGS. 1 and 2, resilient spring clip member 22 faces in the direction of the weight component of pack 12 or 12', and transverse to the tension induced by forked members 21 in closed pockets 22.

Another embodiment of a resilient clip member is illustrated in FIGS. 5 and 6, whereat resilient clip member 22' is illustrated. In this instance, upper and lower spring members 42 and 43 are provided and attached to base 44. Again, the surfaces of spring members 42 and 43 will encircle wire support 14 for more than one hundred eighty degrees thereof, but may be mutually distended to afford convenient release of resilient spring clip member 22' from wire support 14. Ramp members 47 and 48 in the form of compound curves are again included to facilitate engagement of resilient clip member 22' around wire support 14. Resilient clip member 22' is particularly adapted to replace Velcro material 34, as illustrated in FIG. 2, and engage vertical depending members 30 of wire support 14'. The particular configuration of resilient clip member 22' would afford direct vertical engagement while resilient clip member 22 is configured to engage wire support 14 through an initial movement parallel to the back surface of pack 12.

In summary, the instant invention provides for the positive attachment of substantially conventional wire support to otherwise conventional packs utilizing resilient spring clip members which at least partially encircle the wire support and which may be distended to permit attachment and release of the pack to the wire support. In this manner, the pack is positioned on the wire support in such a manner that shocks and bumps will not induce a progressive loosening of the pack relative to the support as is conventional with Velcro material and other fastening means used with such packs. In a particularly preferred embodiment, the ends of the pockets normally provided to accomodate forked members on a wire support are closed as opposed to the prior approach of leaving such pockets open with the forked members extending therethrough, and the ends of the forked members utilized to urge the pack into an open or spread configuration. This would not be possible with fasteners such as Velcro material since the resulting tension on the Velcro material would cause the Velcro material to release. With the resilient spring clip members of the instant invention, however, substantial forces applied axially to the ends of the forked members may be readily accomodated without loosening of the pack relative to the wire support, and the pack may accordingly be securely maintained in an open position.

Although only limited embodiments of the present invention have been illustrated and described, it is anticipated that various changes and modifications will be apparent to those skilled in the art, and that such changes may be made without departing from the scope of the invention as defined by the following claims.

What is claimed is:

1. In the combination of a wire support adapted to attach to and extend from a bicycle, a pack configured to engage the wire support and having an exterior surface of the pack adjacent a length of the wire support, and means to secure the pack to the adjacent length of the wire support;

the improvement comprising, at least one resilient clip member of a spring material shaped to engage the wire support at points spaced more than one hundred eighty degrees around the wire support, the resilient clip member being attached to the pack and comprising the means to secure the pack to the adjacent length of the wire support.

2. A wire support and pack as set forth in claim 1 in which the wire support is in the shape of a U-shaped member adapted to attach to the bicycle at the intersection of the handlebars and the gooseneck, and including a pair of parallel forked members extending from the bicycle, in which the pack includes a pair of pockets defined on the opposed sides of the pack and adapted to receive the forked members of the wire support, and in which the wire support includes a pair of diverging lengths extending substantially perpendicular to and outwardly to the forked members with the pack positioned with the forked members in the pockets and the exterior surface of the pack exterior surface adjacent the perpendicular lengths of the wire support carrying a pair of the resilient spring clip members each adapted to engage the perpendicular lengths of the wire support.

3. A wire support and pack as set forth in claim 2 in which the pockets are closed at the portion thereof adjacent the end portions of the forked members of the wire support whereby the ends of the forked members bear against the closed end of the pocket and urge the bag into an open configuration.

4. A wire support and pack as set forth in claim 1 in which the resilient clip member comprises a base portion adapted to be attached to the pack, a spring member configured in the form of a partial cylinder extending more than one hundred eighty degrees the end of the cylindrical spring member being formed into a partial compound curve and extending outside of the radius of the cylinder to define a ramp portion adapted to distend the cylindrical spring member to accommodate the wire support.

5. A wire support and pack as set forth in claim 1 in which the resilient clip member comprises a base member adapted to be attached to the pack, and a pair of spring members in the form of partial cylindrical surfaces extending from the base member and jointly defining a portion of a cylinder extending greater than one hundred eighty degrees, the two spring members being spaced at the ends thereof remote from the base and each forming a compound curve defining a ramp portion adapted to distend the cylindrical spring members and permit the wire support to enter therebetween.

6. A wire support and pack as set forth in claim 1 in which the wire support includes a pair of forked members adapted to engage a pair of pockets defined on opposed sides of the pack, and in which a pair of vertical members depend from the wire support and engage the pack at a position below that at which the resilient clip member is secured to the surface of the pack.

7. The combination of a wire support adapted to attach to and extend substantially horizontally from a bicycle, a pack configured to be attached to the wire support, and at least one resilient spring clip member positioned on the pack adjacent a length of the wire support to secure the pack to the wire support, the resilient clip member being of a spring material shaped to engage the wire support at points spaced more than one hundred eighty degrees around the wire support with an opening being provided in the clip to provide for insertion of the wire support into the clip member.

8. A wire support and pack combination as set forth in claim 7 in which the wire support includes a pair of forked members extending horizontally, and the pack includes a pair of complimentary pockets on opposed sides thereof to receive the forked members, the pockets being closed at the ends thereof adjacent the ends of the forked members and of such a length to induce a tension in the pack at the pocket members when the forked members are fully inserted in the pockets and the clip member engaged with the wire support.

9. A wire support and pack combination as set forth in claim 7 in which a pair of resilient spring clip members are positioned on an exterior surface of the pack adapted to be positioned facing the wire support as it extends from a bicycle.

10. A wire support and pack combinations as set forth in claim 7 in which the wire support includes a pair of diverging sections and a pair of forked members extending in the direction in which the wire support extends from the bicycle and perpendicular to the diverging sections, in which the pack includes a pair of pockets on opposed sides adapted to receive the forked members with the forked members being of a length to bear against the closed ends of the pockets, and in which a pair of resilient spring clip members are positioned on a surface of the pack extending transversely between the pocket members and positioned to engage the diverging members of the wire support.

* * * * *